United States Patent
Hunukumbure et al.

(10) Patent No.: US 11,206,118 B2
(45) Date of Patent: Dec. 21, 2021

(54) CONFIGURATION OF REFERENCE SIGNALS IN A MULTI-TRANSMISSION POINT TELECOMMUNICATION SYSTEM

(71) Applicant: Samsung Electronics Co., Ltd., Suwon-si (KR)

(72) Inventors: Mythri Hunukumbure, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 16/969,945

(22) PCT Filed: Feb. 15, 2019

(86) PCT No.: PCT/KR2019/001889
§ 371 (c)(1),
(2) Date: Aug. 13, 2020

(87) PCT Pub. No.: WO2019/160379
PCT Pub. Date: Aug. 22, 2019

(65) Prior Publication Data
US 2021/0014021 A1    Jan. 14, 2021

(30) Foreign Application Priority Data
Feb. 16, 2018  (GB) .................... 1802574

(51) Int. Cl.
*H04L 5/00*        (2006.01)
*H04W 72/04*    (2009.01)
(52) U.S. Cl.
CPC .......... *H04L 5/0048* (2013.01); *H04L 5/0035* (2013.01); *H04W 72/04* (2013.01); *H04W 72/042* (2013.01)

(58) Field of Classification Search
CPC .... H04L 5/0048; H04L 5/0035; H04W 72/04; H04W 72/042
See application file for complete search history.

(56) References Cited

U.S. PATENT DOCUMENTS 8,780,860 B2 *  7/2014  Kwon ................... H04L 5/0005
2013/0156001 A1  6/2013  Gomadam
(Continued)

FOREIGN PATENT DOCUMENTS

EP    2693654 A1    2/2014
EP    3487105 A1    5/2019
(Continued)

OTHER PUBLICATIONS

ZTE et al., "Remaining details on DL DMRS and UL DMRS", 3GPP TSG RAN WG1 Meeting NR#3, Sep. 18-21, 2017, R1-1715449, 9 pages.
(Continued)

*Primary Examiner* — Ronald B Abelson (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of configuring a reference signal in a telecommunication system, comprising the step of determining if multiple Transmission Points, TRP, operation is activated or not, and configuring the reference signal in accordance with the determination.

12 Claims, 3 Drawing Sheets

(56) References Cited

U.S. PATENT DOCUMENTS

| | | | |
|---|---|---|---|
| 2015/0200793 A1 | 7/2015 | Baker et al. | |
| 2018/0368013 A1 | 12/2018 | Yoo et al. | |
| 2019/0261329 A1 | 8/2019 | Park et al. | |
| 2019/0305908 A1 | 10/2019 | Lee et al. | |
| 2020/0083996 A1 | 3/2020 | Hunukumbure et al. | |

FOREIGN PATENT DOCUMENTS

| | | |
|---|---|---|
| EP | 2795827 B1 | 9/2019 |
| EP | 3618336 A1 | 3/2020 |
| GB | 2562117 A | 11/2018 |
| WO | 2018/021867 A1 | 2/2018 |
| WO | 2018/230900 A1 | 12/2018 |

OTHER PUBLICATIONS

Samsung, "Discussion on PT-RS", 3GPP TSG RAN WG1 Meeting 90bis, Oct. 9-13, 2017, R1-1717631, 9 pages.

Nokia et al. "On Multiplexing of Different RS Types", 3GPP TSG-RAN WG1 NR Ad-Hoc#3, Sep. 18-21, 2017, R1-1716507, 5 pages.

CATT, "Remaining issues on PT-RS", 3GPP TSG RAN WG1 Meeting AH 1801, Jan. 22-26, 2018, R1-1800246, 5 pages.

Samsung, "On DL PT-RS design", 3GPP TSG RAN WG1 NR Ad-hoc#2, Jun. 27-30, 2017, R1-1710686, 5 pages.

International Search Report dated May 24, 2019 in connection with International Patent Application No. PCT/KR2019/001889, 3 pages.

Written Opinion of the International Searching Authority dated May 24, 2019 in connection with International Patent Application No. PCT/KR2019/001889, 5 pages.

Combined Search and Examination Report under Sections 17 and 18(3) dated Jul. 22, 2019 in connection with United Kingdom Patent Application No. GB1902050.2, 8 pages.

Samsung, "DL PT-RS design", 3GPP TSG RAN WG1 #90, Aug. 21-25, 2017, R1-1703605, 5 pages.

Supplementary European Search Report dated Jan. 13, 2021 in connection with European Patent Application No. 19 75 4367, 12 pages.

* cited by examiner

CONFIGURATION OF REFERENCE SIGNALS IN A MULTI-TRANSMISSION POINT TELECOMMUNICATION SYSTEM

CROSS-REFERENCE TO RELATED APPLICATIONS

This application is a 371 of International Application No. PCT/KR2019/001889 filed on Feb. 15, 2019, which claims priority to United Kingdom Application No. 1802574.2 filed on Feb. 16, 2018, the disclosures of which are herein incorporated by reference in their entirety.

BACKGROUND

1. Field

The present invention relates to the configuration of reference signals in a telecommunication network comprising multi-TRPs (Transmission Points).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present invention relates to the configuration of reference signals in a telecommunication network comprising multi-TRPs (Transmission Points).

As technology advances, a method for initial configuration signaling, multiplex, density/pattern and power boosting is required in 5th Generation (5G) of New Radio (NR) systems.

SUMMARY

Embodiments of the present invention aim to address shortcoming in the prior art, whether mentioned herein or not.

According to an aspect of the present invention, there is provided a method of configuring a reference signal in a telecommunication system, comprising the step of determining if multiple Transmission Points, TRP, operation is activated or not, and configuring the reference signal in accordance with the determination.

In an embodiment, the reference signal is a Phase Tracking Reference Signal, PTRS.

In an embodiment, there is a further step of mapping two or more PTRS antenna ports to specific Resource Elements, RE, in a time and frequency resource grid in the case two or multiple TRP operation is activated and where two or more Physical Downlink Shared Channels, PDSCH, can be configured to a single User Equipment.

In an embodiment, two PTRS ports are configured and there is a non full-overlapping resource allocations, for the non overlapping part, either: orthogonal multiplexing of Resource Elements is preserved; or Resource Elements allocated for the PTRS associated with another DMRS port group are not muted.

In an embodiment, if PTRS frequency density is different in two or more TRPs, in a case where two Downlink, DL, DMRS port groups are transmitted, each DMRS port group being associated with one PTRS port and one CW respectively, the frequency density of the PTRS port corresponding to the CW/DMRS port group with smaller allocated BW or lower density is set to be the same as that of the PTRS port corresponding to the CW/DMRS port group with the larger allocated BW or higher density when two PTRS ports are active or configured.

In an embodiment, the frequency density setting is applied to only overlapping BWs of multiple TRPs or to both overlapping and non-overlapping BWs of multiple TRPs.

In an embodiment, if PTRS frequency density is different in two or more TRPs, PTRS frequency density is unchanged and a power boosting factor is implicitly derived from PTRS frequency density and resource allocation configured by two TRPs, dependent at least in part on a number of muted REs which are available.

In an embodiment, if PTRS frequency density is different in two or more TRPs, PTRS frequency density is unchanged and a power boosting factor is explicitly indicated to the UE in RRC, MAC CE or DCI signaling, dependent at least in part on a number of muted REs which are available.

In an aspect of the present invention, there is provided a non-transitory data carrier carrying control code to implement the methods of any of the defined method aspects.

In an aspect of the present invention, there is provided an apparatus arranged to perform the method of any of the defined method aspects.

According to an aspect of the present invention, there is provided a method of configuration and signaling to configure PTRS across a plurality of transmission points (TRPs). Particular features thereof and alternative options are presented in the following description. The skilled person will recognize that certain features may be independent from other features and that benefits may be achieved by implementing some and not all of the features described in the following description.

Embodiments provide a TCI configuration mechanism for PTRS in a multi-TRP operation scenario.

Embodiments provide a mechanism for power boosting of PTRS, as well providing a signaling procedure in a multi-TRP scenario.

Although a few preferred embodiments of the present invention have been shown and described, it will be appreciated by those skilled in the art that various changes and modifications might be made without departing from the scope of the invention.

The present invention provides a method for initial configuration signaling, multiplex, density/pattern and power boosting. It particularly, The present invention provides the configuration of the Phase Tracking Reference Signal (PTRS) in 5th Generation (5G) of New Radio (NR) systems.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In 3GPP standardization discussions, it has been agreed that one or multiple NR Physical Downlink Control Channels (PDCCH) can support one or multiple NR Physical Downlink Shared Channels (PDSCH) as per the following agreements.

Support NR reception of at least one but no more than two of the following:
- Single NR-PDCCH corresponding to the same NR-PDSCH data layers from multiple TRPs within the same carrier
- Single NR-PDCCH corresponding to different NR-PDSCH data layers from multiple TRPs within the same carrier
- Multiple NR-PDCCH corresponding to different NR-PDSCH data layers from multiple TRPs within the same carrier In the case of multiple NR-PDCCH, the following (which may or may not impact the agreed specification) are considered for the reduction of UE PDCCH detection complexity:
- Note that different NR-PDSCH data layers from single TRP is special case.
- The alignment of PDCCH generation rules among TRPs, e.g. one identical control resource set across TRPs
- Signaling the maximum number of multiple NR-PDCCH reception via L1 and/or high layer signaling
- Other techniques can be considered.

The following is agreed for NR reception:
- Single NR-PDCCH schedules single NR-PDSCH where separate layers are transmitted from separate TRPs
- Multiple NR-PDCCHs each scheduling a respective NR-PDSCH where each NR-PDSCH is transmitted from a separate TRP
- Note: the case of single NR-PDCCH schedules single NR-PDSCH where each layer is transmitted from all TRPs jointly can be done in a specification-transparent manner For PTRS design, power boosting is also supported and captured in the below agreements:
- RRC parameter is introduced to configure the PDSCH to PTRS Energy Per Resource Element (EPRE) ratio per PTRS port
- Two bits If PDSCH to PTRS EPRE ratio per PTRS port is not configured for downlink, this parameter is set to the default value (which is to be defined)

At least for DL SU-MIMO scheduling, the EPRE ratio between PTRS and PDSCH is by default implicitly indicated by the number of scheduled PTRS ports for the UE The default EPRE ratio is 0 dB for 1 PTRS port case and 3 dB for 2 PTRS port case Other combinations including EPRE up to 6 dB are allowed by RRC configuration of association between number of DL PTRS ports and EPRE ratios A DL PTRS port and the DL DMRS port(s) within the associated DL DMRS port group are Quasi co-located (QCLed) with respect to delay spread, Doppler spread, Doppler shift, average delay, spatial Rx parameters.

If one DL PTRS port is transmitted for two scheduled DL DMRS port groups, the PTRS port and the DMRS port(s) which are not in the associated DMRS port group are QCLed with respect to Doppler spread, Doppler shift and possibly spatial QCL parameters PDSCH to PTRS EPRE ratio per layer=$-10*\log 10(N_{P-TRS})-A$ Where the parameter A is given by the table below where the RRC parameter is DL-PTRS-EPRE-ratio, with a default value of 00:

| | A [dB] | # PDSCH layers in DMRS group* | | | | | |
|---|---|---|---|---|---|---|---|
| | | 1 | 2 | 3 | 4 | 5 | 6 |
| RRC parameter | 00 | 0 | 3 | 4.77 | 6 | 7 | 7.78 |
| | 01 | 0 | 0 | 0 | 0 | 0 | 0 |
| | 10 | | | Reserved | | | |
| | 11 | | | Reserved | | | |

Support a Resource Block, RB-level offset for selecting RBs among the scheduled RBs for mapping PTRS, and the offset is implicitly determined by User Equipment ID, UE-ID (i.e., C-RNTI).

The default value of Resource Element, RE-level offset for selecting subcarrier for mapping PTRS within a RB is zero (lowest subcarrier).

Support implicit derivation the RE-level offset for selecting subcarrier for mapping PTRS within a RB from one or more parameters (e.g. associated DMRS port index, SCID, Cell ID, to be decided)

This can be used at least for avoiding collision with DC tone

In addition, an RRC parameter "PTRS-RE-offset" is also supported that explicitly indicates the RE-level offset and replaces the implicit offset, at least for avoiding collision with DC tone.

Figure 1:
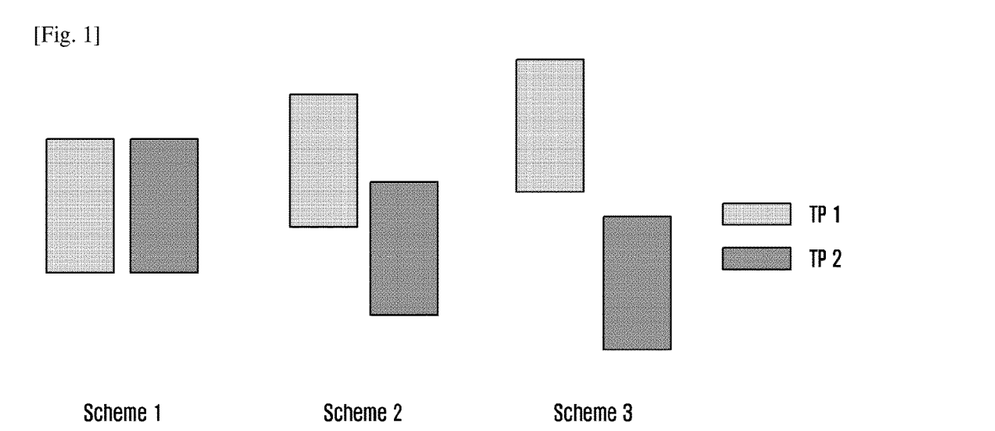
FIG. 1 shows different transmission schemes for PDSCH resource allocation.

The current design of PTRS can only be applied to the case where resource allocations of two DMRS port groups are identical, which is true in single TRP case. However, for multi-TRP cases, when multiple Continuous Waves (CWs) come from multiple TRPs and one DMRS port group is scheduled for each CW, the resource allocation for each CW might not be identical as shown in FIG. 1. For simplicity, in the following, the 2 TRP case is discussed herein but the principle can be easily extended to cases with more than 2 TRPs.

In FIG. 1, for scheme 2 and 3 where allocated RBs from two TRPs only partially overlap or do not overlap, respectively, PTRS requires a new configuration at least from following perspectives:

PTRS multiplex, density and pattern
Power boosting design

Embodiments of the invention address at least issues related to PTRS multiplex, density and pattern and power boosting design In essence, it is necessary to consider both one PDSCH and multiple PDSCH cases as agreed in the 3GPP standardization process. In total, four cases need to be considered:

1) Single PDSCH with full overlapping;
2) Single PDSCH with non or partial overlapping;
3) Multiple PDSCHs with full overlapping;
4) Multiple PDSCHs with non or partial overlapping For the non or partial overlapping cases (see (2) above) and multiple PDSCH cases ((3) and (4) above), the question is how to multiplex PTRS with PTRS A fundamental problem regarding PTRS and Multi-TRP configuration is that PTRS design is carrier frequency agnostic, but the common understanding in the art is that it should only be used for frequencies above 6 GHz, because tracking reference signals (TRS) are provided for frequencies below 6 GHz.

For multi-TRP operation, e.g., coordinated multipoint (CoMP), up to LTE, only frequencies below 6 GHz are considered. If only frequencies below 6 GHz are considered for multi-TRP operation, and PTRS is not expected to be used, PTRS should always be switched off. In such a case, the UE may assume that the following configurations are not occurring simultaneously for the received PDSCH:

multi-TRP operation is activated or any RRC, MAC CE or DCI parameter indicating the activation of multi-TRP operation is 'ON'

RRC parameter PTRS-presence is 'ON'

However, multi-TRP operation should also be used for frequencies above 6 GHz, at least for avoiding blockage. If that is the case, the two configurations above can co-exist.

If PTRS and multi-TRP can be configured simultaneously, PTRS multiplex may be adapted for multi-TRP operation. The current agreement for multiplex is "For single-user case, support orthogonal multiplexing". In such a case, even with multiple PDSCHs, it is still a single-user case and the current agreement should apply.

With multiple PDSCHs, multiple PTRS ports may be configured. In this case, two DMRS groups are scheduled to the same UE, the number of DL PTRS ports is higher-layer configured per Transmission Configuration Indicator (TCI) state for PDSCH transmission in the higher layer parameter DL-PTRS-ports and the number of DL PTRS ports associated to the TCI in DCI is up to 2. However, if each TRP schedules its own PDCCH and PDSCH independently, there are two issues:

For DL, the TCI state in DCI may only indicate the PTRS port associated to its own DMRS port group in its own PDSCH. Without knowing the PTRS configuration for another PDSCH from a different TRP, orthogonal PTRS configuration cannot be maintained. In such a case, PTRS configuration information, such as TCI state in DCI, should be known to both TRPs.

For UL, such information should be implicitly inferred from SRS resource/resource set configuration, UE capability and RRC configuration, e.g., UL-PTRS-ports.

When two PTRS ports are configured, as mentioned above, non-full overlapping resource allocation might happen and PTRS multiplex, density and pattern should be modified. For the non-overlapping part, there are two following alternative techniques, forming embodiments of the present invention:

1: keep orthogonal multiplexing to comply with agreement, e.g., REs allocated for the PTRS associated with another DMRS group are muted 2: REs allocated for the PTRS associated with another DMRS group are NOT muted to reduce reference signaling overhead Number 2 above is essentially the same as using zero power PTRS. Even though Number 1 above has a larger signaling overhead, it may ease the power boosting because there will always be muted REs for the PTRS port to borrow power from and boost its own power. In this sense, it may simplify the power boosting issue described in the following.

Figure 2:
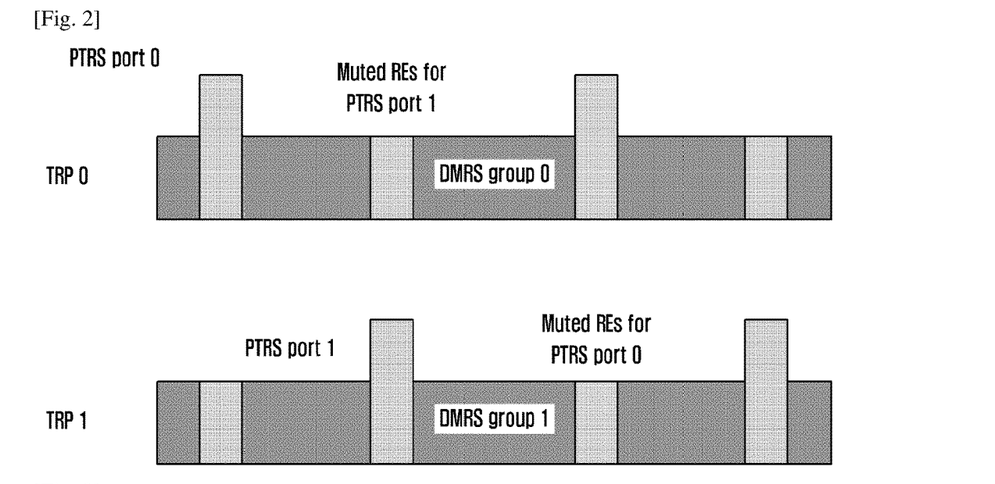
FIG. 2 shows a representation of different transmission schemes for PDSCH resource allocation.

Power boosting using muted REs when multiple PTRS ports are configured has been agreed in 3GPP standardization discussions, as shown in FIG. 2, which shows the fully overlapped case as per Scheme 1 in FIG. 1. PTRS Port 0 on TRP 0 is power boosted as PTRS Port 0 on TRP 1 is muted and its power may be 'borrowed', as represented by the higher shaded bar.

PTRS frequency density may depend on Bandwidth (BW) or number of Resource Blocks (RBs) allocated to the UE. For non multi-TRP case, the same RBs are allocated for two DMRS groups so that the frequency density stays the same and power borrowing from muted REs gives exactly a 3 dB power boost. In other words, it works well with a fully overlapping scheme, as shown in FIG. 2. However, for non or partial overlapping schemes, the numbers of RBs allocated from two TRPs might be different and thus the PTRS frequency density might also be different as in FIG. 3.

Figure 3:
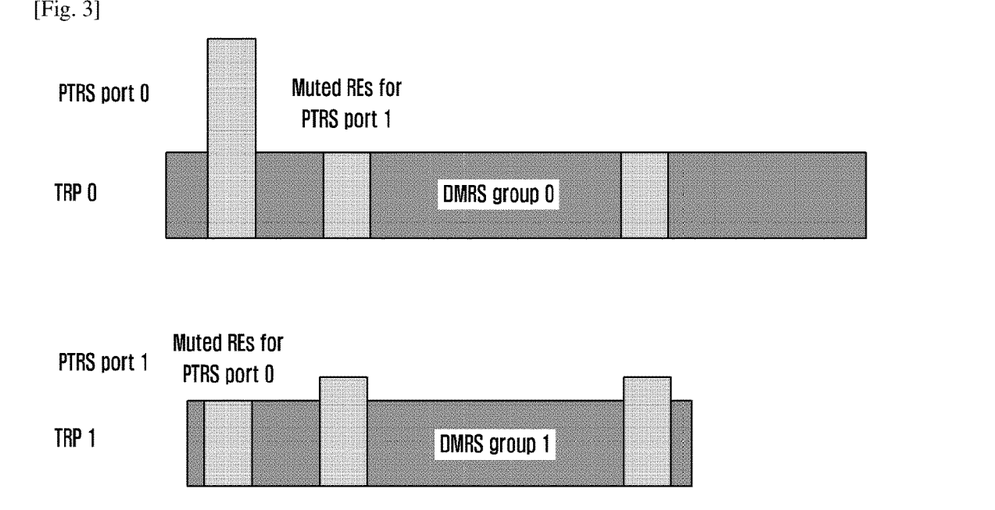
FIG. 3 shows a representation of power boosting from muted RE power borrow for non-full overlapping case (different PTRS frequency density)

In this case, the PTRS density of TRP 0 is lower than that of TRP 1. For TRP 0, there are two muted REs (the two rightmost ones) and one RB containing PTRS so that the PTRS port power can be boosted by 3 times, as shown by the elongated bar for PTRS on Port 0.

Figure 4:
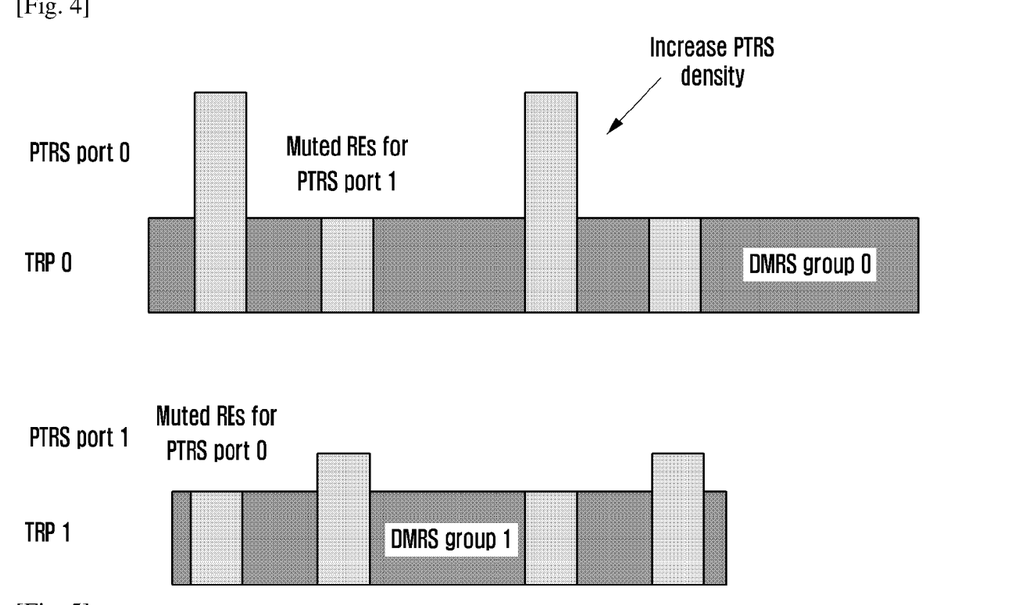
FIG. 4 shows a representation of power boosting from muted RE power borrow for non-full overlapping case (same PTRS frequency density)

However, for TRP 1, there is only one muted RE for PTRS Port 0, but two RBs containing PTRS, so PTRS port power can only be boosted by 1.5 times, indicated by the slightly shorter bar for the two rightmost PTRS bars for TRP 1. Such an arrangement will give uneven power boosting for such a case. Therefore, to address this, the following options form embodiments of the invention:

Option 1: For the case where two DL DMRS port groups are transmitted, where each DMRS port group is associated to one PTRS port and one CW respectively, the frequency density of the PTRS port corresponding to the CW with smaller allocated BW should be set to be the same as that of the PTRS port corresponding to CW with the larger allocated BW when two PTRS ports are active or configured as shown in FIG. 4, where the PTRS density is increased for TRP 0.

Option 2: Do not change PTRS frequency density but the power boosting factor is implicitly derived from PTRS frequency density and resource allocation configured by two TRPs and it at least depends on how many muted REs are available. A cap can be added to guarantee that the power of PTRS ports after boosting is the same for two PTRS ports.

Option 3: Do not change PTRS frequency density but the power boosting factor is explicitly indicated to the UE in RRC, MAC CE or DCI signaling and it at least depends on how many muted REs are available.

Option 4: a combination of Options 1 to 3 above.

Note that for Option 2 to 4, the power boosting factor may need to be updated every time slot. Therefore, it should be signaled using lower layer signaling, e.g., DCI.

Figure 5:
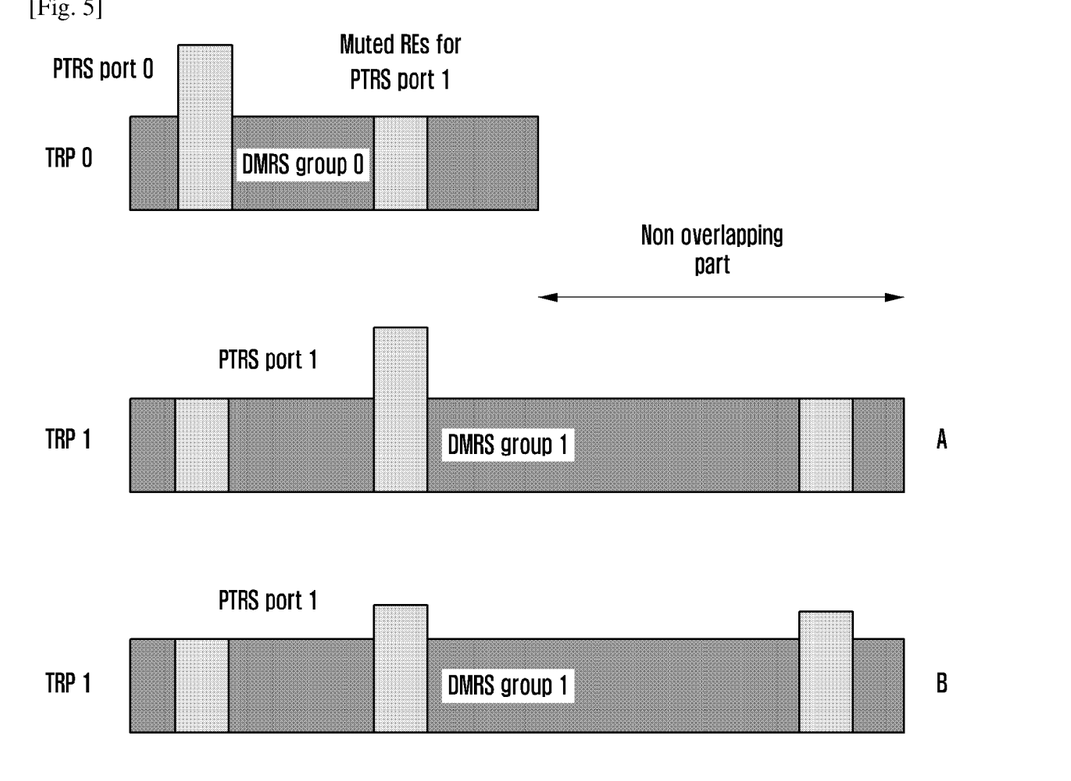
FIG. 5 shows a representation of power boosting from muted RE power borrow in a partial overlapping case.

The embodiments above only address the problem in the overlapping part. For the non-overlapping portion as shown in FIG. 5, other solutions may be required, various options for which set out below.

Option 1: For multi-TRP operation, power boosting due to power borrowing from a muted RE for another PTRS port is allowed only in the overlapped part. For a non-overlapping part, such an operation is not allowed. This is shown in FIG. 5A.

Option 2: For multi-TRP operation, power boosting due to power borrowing from a muted RE for another PTRS port is allowed in both the overlapped part and the non-overlapped parts. However, the power from the muted REs will be divided equally and for both overlapping and non-overlapping part to boost PTRS port and after power boosting, PTRS power is the same in both overlapped and non-overlapped parts. This is shown in FIG. 5B. A benefit of this option is that it maintains the same SINR for PTRS ports in all allocated RBs Option 3: combination of Option 1 and Option 2 and use explicit signaling, e.g., RRC, MAC CE or DCI, to choose Option 1 or 2 dynamically or semi-persistently.

Figure 6:
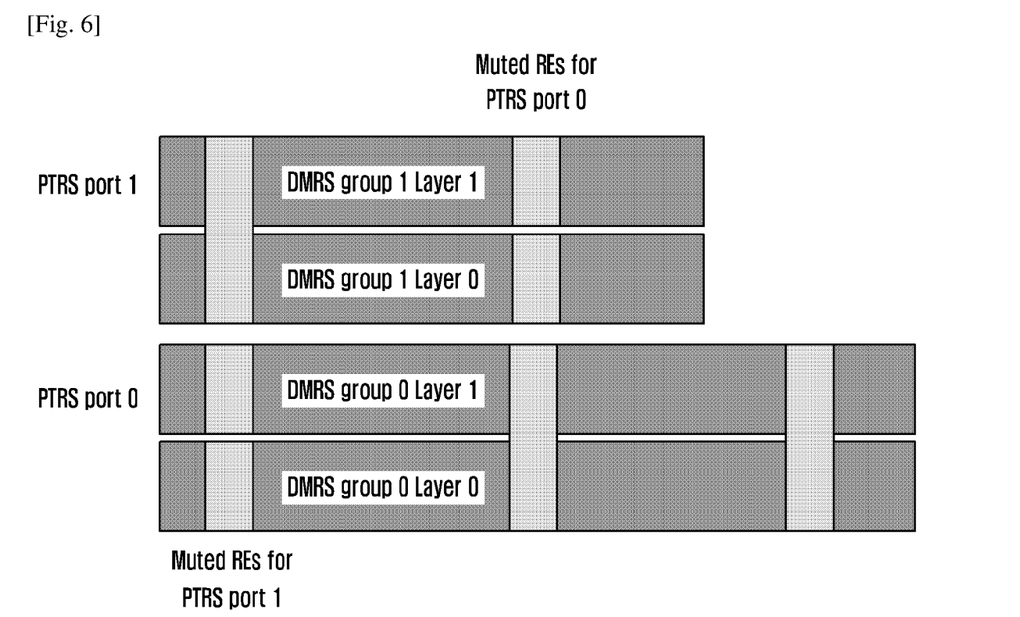
FIG. 6 shows a representation of power boosting from muted RE power borrow in a Partial overlapping case with power boosting within each DMRS port group.

Option 4: No power borrowing from a muted RE for another PTRS port is allowed for multi-TRP operation. Therefore, power boosting is only conducted within each DMRS port group across multiple layers for multi-TRP operation as shown in FIG. 6.

Figure 7:
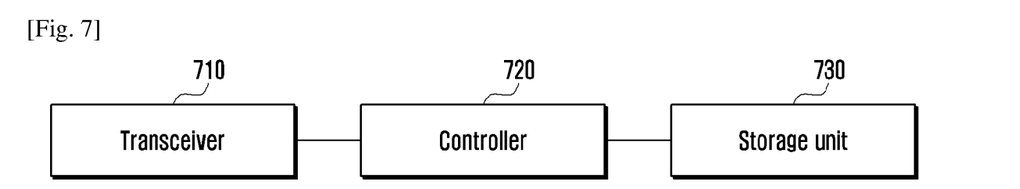
FIG. 7 shows a structure of a UE according to an embodiment of the present invention.

FIG. 7 shows a structure of a UE according to an embodiment of the present invention.

Referring to FIG. 7, the UE may include a transceiver (or transmission/reception unit 710), a controller(720), and a storage unit(730). In the present invention, controller(720) may be defined as a circuit or an application specific integrated circuit or at least one processor.

Transceiver(710) may transmit and receive signals with other network entities. Transceiver(710) may receive system information from, for example, a base station and may receive a synchronization signal or a reference signal.

Controller(720) may control the overall operation of the UE according to the embodiments of the present invention.

Storage unit(730) may store at least one of information transmitted and received through the transceiver(710) and information generated through controller(720).

Figure 8:
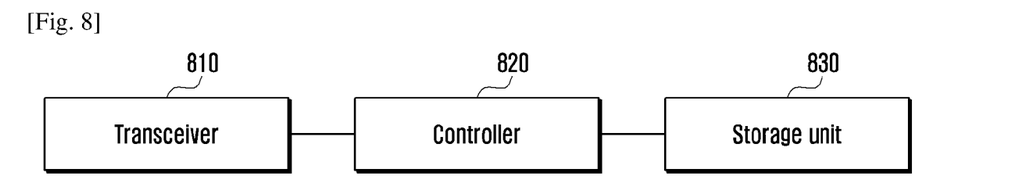
FIG. 8 shows a structure of a Transmission Point (or base station) according to an embodiment of the present invention.

FIG. 8 shows a structure of one of a Transmission Point (or a base station) according to an embodiment of the present invention.

Referring to FIG. 8, the Transmission Point may include a transceiver (transmission/reception unit 810), a controller (820), and a storage unit(830). In the present invention, controller(820) may be defined as a circuit or an application specific integrated circuit or at least one processor.

Transceiver(810) may transmit and receive signals with other network entities. Transceiver(810) may transmit system information to the UE, for example, and may transmit a synchronization signal or a reference signal.

Controller(820) may control the overall operation of the Transmission Point according to the embodiment of the present invention.

The storage unit(830) may store at least one of information transmitted/received through transceiver(810) and information generated through the controller(820).

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method performed by a base station in a telecommunication system, the method comprising:
    determining whether a multiple transmission points (TRPs) operation is activated or not;
    mapping phase tracking reference signal (PTRS) ports to resource elements (REs) in a time and frequency resource grid, in case that the multiple TRPs operation is activated and multiple physical downlink shared channels (PDSCHs) can be configured to a user equipment (UE); and
    transmitting, to the UE, PTRS configuration information based on the mapping.

2. The method of claim 1, wherein in case that two PTRS ports are configured and there is a non-overlapping part of resource allocations between the two PTRS ports, for the non-overlapping part, either: orthogonal multiplexing of REs is preserved; or REs allocated for a PTRS associated with another DMRS port group are not muted.

3. The method of claim 1, wherein in case that two downlink (DL) demodulation reference signal (DMRS) port groups are transmitted and PTRS frequency densities are different in two TRPs, each DL DMRS port group being associated with one PTRS port and one continuous wave (CW) respectively, a PTRS frequency density corresponding to a DMRS port group with smaller allocated bandwidth (BW) is set to be the same as a PTRS frequency density corresponding to a DMRS port group with larger allocated BW.

4. The method of claim 3, wherein the setting of the PTRS frequency densities is applied to only overlapping BWs of the two TRPs or to both the overlapping BWs and non-overlapping BWs of the two TRPs.

5. The method of claim 1, wherein in case that PTRS frequency densities are different in two TRPs, the PTRS frequency densities are unchanged and a power boosting factor is implicitly derived from the PTRS frequency densities and resource allocations configured by the two TRPs, dependent at least in part on a number of muted REs which are available.

6. The method of claim 1, wherein in case that PTRS frequency densities are different in two TRPs, the PTRS frequency densities are unchanged and a power boosting factor is explicitly indicated to the UE through at least one of a radio resource control (RRC) signaling, a medium access control (MAC) control element (CE) signaling, or a downlink control information (DCI) signaling, dependent at least in part on a number of muted REs which are available.

7. A base station in a telecommunication system, the base station comprising:
    a transceiver; and
    a controller configured to:
    determine whether a multiple transmission points (TRPs) operation is activated or not,
    map phase tracking reference signal (PTRS) ports to resource elements (REs) in a time and frequency resource grid, in case that the multiple TRPs operation is activated and multiple physical downlink shared channels (PDSCHs) can be configured to a user equipment (UE), and
    transmit, to the UE via the transceiver, PTRS configuration information based on the mapping.

8. The base station of claim 7, wherein in case that two PTRS ports are configured and there is a non-overlapping part of resource allocations between the two PTRS ports, for the non-overlapping part, either: orthogonal multiplexing of REs is preserved; or REs allocated for a PTRS associated with another DMRS port group are not muted.

9. The base station of claim 7, wherein in case that two downlink (DL) demodulation reference signal (DMRS) port groups are transmitted and PTRS frequency densities are different in two TRPs, each DL DMRS port group being associated with one PTRS port and one continuous wave (CW) respectively, a PTRS frequency density corresponding to a DMRS port group with smaller allocated bandwidth (BW) is set to be the same as a PTRS frequency density corresponding to a DMRS port group with larger allocated BW.

10. The base station of claim 9, wherein the setting of the PTRS frequency densities is applied to only overlapping BWs of the two TRPs or to both the overlapping BWs and non-overlapping BWs of the two TRPs.

11. The base station of claim 7, wherein in case that PTRS frequency densities are different in two TRPs, the PTRS frequency densities are unchanged and a power boosting factor is implicitly derived from the PTRS frequency densities and resource allocations configured by the two TRPs, dependent at least in part on a number of muted REs which are available.

12. The base station of claim 7, wherein in case that PTRS frequency densities are different in two TRPs, the PTRS frequency densities are unchanged and a power boosting factor is explicitly indicated to the UE through at least one of a radio resource control (RRC) signaling, a medium access control (MAC) control element (CE) signaling, or a downlink control information (DCI) signaling, dependent at least in part on a number of muted REs which are available.

* * * * *

UNITED STATES PATENT AND TRADEMARK OFFICE
CERTIFICATE OF CORRECTION

PATENT NO. : 11,206,118 B2
APPLICATION NO. : 16/969945
DATED : December 21, 2021
INVENTOR(S) : Hunukumbure et al.

Page 1 of 1

It is certified that error appears in the above-identified patent and that said Letters Patent is hereby corrected as shown below:

On the Title Page

Item (30) Foreign Application Priority Data:
"Feb. 16, 2018 (GB)................1802574"
Should read:
-- Feb. 16, 2018 (GB).............1802574.2 --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*